Nov. 11, 1969　　　　　W. RAINEY　　　　　3,477,326
HIGH SPEED WIRE CUT-OFF MACHINE
Filed June 23, 1966　　　　　　　　　　　　　　　7 Sheets-Sheet 1

INVENTOR
WALTON RAINEY
BY
ATTORNEYS

INVENTOR
WALTON RAINEY

Nov. 11, 1969 W. RAINEY 3,477,326
HIGH SPEED WIRE CUT-OFF MACHINE
Filed June 23, 1966 7 Sheets-Sheet 3

INVENTOR
WALTON RAINEY
BY
ATTORNEYS

Nov. 11, 1969   W. RAINEY   3,477,326
HIGH SPEED WIRE CUT-OFF MACHINE
Filed June 23, 1966   7 Sheets-Sheet 4

INVENTOR
WALTON RAINEY
BY
ATTORNEYS

Nov. 11, 1969 W. RAINEY 3,477,326
HIGH SPEED WIRE CUT-OFF MACHINE

Filed June 23, 1966 7 Sheets-Sheet 6

INVENTOR
WALTON RAINEY,
BY
ATTORNEYS

United States Patent Office 3,477,326
Patented Nov. 11, 1969

3,477,326
HIGH SPEED WIRE CUT-OFF MACHINE
Walton Rainey, Ardmore, Pa., assignor to Thomas & Betts Corporation, Princeton, N.J., a corporation of New Jersey
Filed June 23, 1966, Ser. No. 559,992
Int. Cl. B23d 25/16, 25/12; B26d 1/56
U.S. Cl. 83—296                              8 Claims

ABSTRACT OF THE DISCLOSURE

A high speed wire cut-off machine for severing selected lengths of wire from a continuously moving wire. The machine includes means for feeding wire and continuously adjustable measuring means for determining the selected length of wire to be cut, said measuring means being adapted to be continuously adjustable to measure selected lengths of wire of different lengths. The measuring means preferably comprises driving means, driven means and adjustable power transfer means connected between said driving means and said driven means wherein adjustment of said power transfer means varies the relative speeds of said driving means and said driven means in order to vary the length of wire to be cut. Cutter means is controlled by the continuously adjustable measuring means to sever the selected length of wire from the continuously moving wire.

---

This invention relates to high speed wire cut-off machines intended to cut off prescribed lengths of stranded, solid, bare or insulated wires.

In existing machines for cutting stranded or solid insulated wires into prescribed lengths, it is usual to combine the cutting-off operation with a simultaneous wire stripping operation. This, however, creates problems. It is extremely difficult to prevent fraying of the stripped ends of the insulation during subsequent stacking, bundling, storing and handling of the cut-off stripped wires. Thus, subsequent operations such as the application of wire terminals require preliminary hand-straightening of the frayed ends before hand-operated or automatic terminal-applying machines will accept the wires. Furthermore, machines for cutting and stripping are relatively slow because the machine must be stopped after cutting in order to strip the cut-off wires.

An object of the present invention is to provide a high speed cutting machine that will cut wires in lengths of from 2 to 180 inches in any fractional part of an inch desired at a maximum production rate ranging up to 30,000 pieces per hour for wires from 2 inches to 12 inches with somewhat slower rates for wires of greater lengths.

Other objects and features of this invention are the provision of a high-speed wire cutting machine in which wire cutting may be effected while the wire is moving at full wire velocity through the machine without any need to stop or slow wire movement while prescribed lengths are being cut from the moving wire.

Further objects and features of the invention are the provision of novel means in the machine for driving the wire through the machine at accurate linear speeds, as well as the provision of a novel wire measuring system for providing highly accurate measurement of prescribed wire lengths to be cut from the moving wire, and the provision of novel cutting means for severing the measured lengths of wire from the latter while the wire velocity remains undiminished, and of providing wire collecting and bundling means for the severed lengths of wire.

Further objects and features of the invention will become apparent from the following specification and the accompanying drawings, wherein:

FIG. 3b is an elevational view of the cutter head of FIG. 3a.

Figures 1, 1A, 2C, 2D:
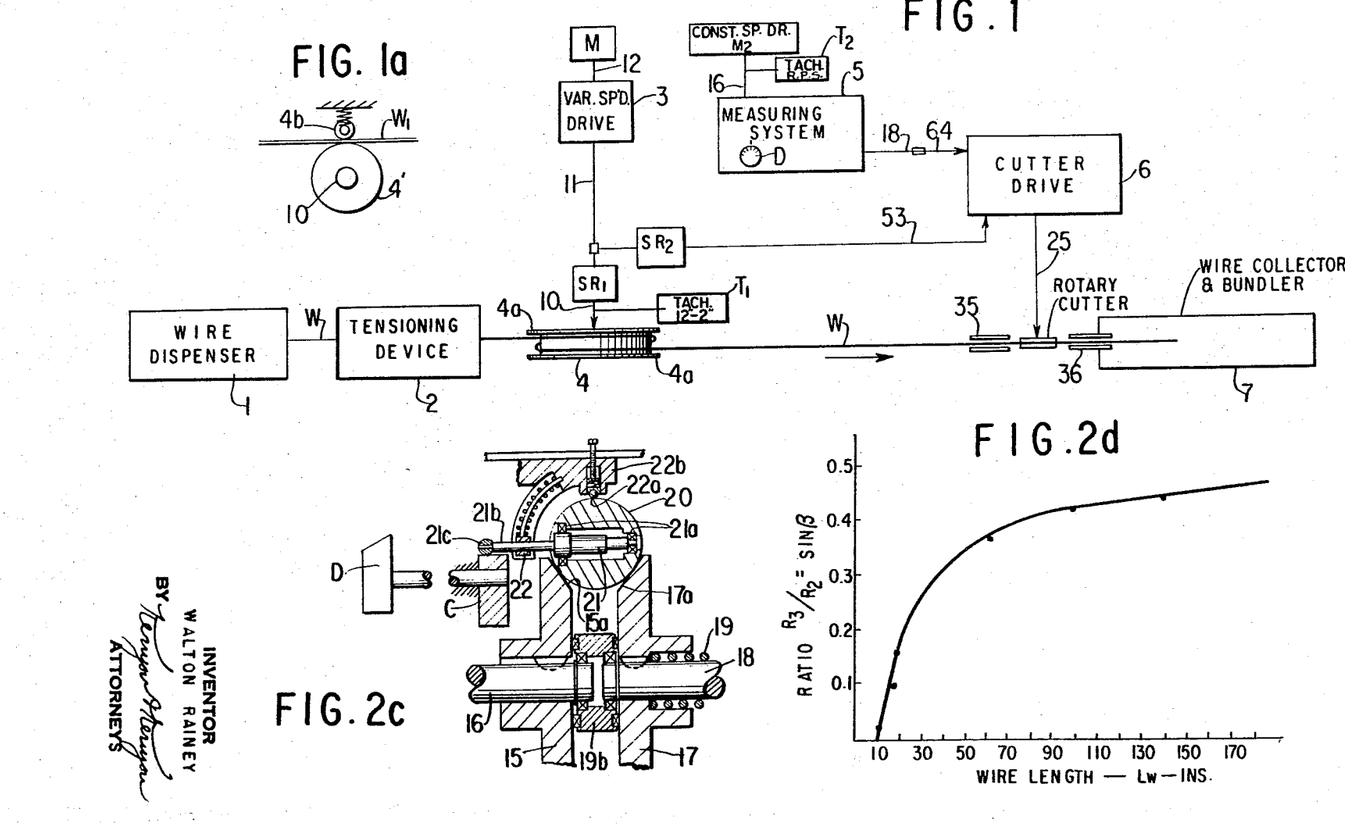
FIG. 1 is a block diagram illustrating the components of a high-speed wire cutting machine embodying the invention.
FIG. 1a is a diagrammatic illustration of an alternative wire driving arrangement.
FIG. 2c is a diagrammatic view of the mounting mechanism for the shaft of the ball of the measuring system.
FIG. 2d is a graph illustrating the relationship of wire length to be cut off and shaft angle settings required in the measuring system.

Referring to the drawings and first to FIG. 1, the principal components of the high speed wire cut-off machine are illustrated in this block diagram. These components are: a wire dispenser 1, either of conventional reel or barrel type; a conventional tensioning device 2 through which wire W from the dispenser is drawn for removal of twist or curl from the dispensed wire; a motor-driven variable speed drive 3 that is preferably adjustable manually, for driving a wire drive wheel 4 through a speed reducer $SR_1$ including a tachometer $T_1$ calibrated in inches from 12″ down to 2″; a measuring system 5 driven from a separate constant speed drive $M_2$ with a tachometer $T_2$ calibrated in r.p.s.; a cutter drive mechanism 6 driven through a speed reducer $SR_2$ from the variable speed drive to rotate the rotary cutters periodically in response to a mechanical signal from the measuring system to the cutter drive clutch mechanism, to cause said cutters to sever prescribed wire lengths; and a wire collector and bundler 7 to receive the cut-off wire lengths.

Wire dispenser 1, tensioning device 2 and variable speed drive 3 are of conventional construction and available commercially as are tachometers $T_1$ and $T_2$, and speed reducers $SR_1$ and $SR_2$ and are arranged so that the wire from dispenser 1 is drawn through tensioning device 2 by rotation of wire wheel drive 4 which is driven through speed reducer $SR_1$ and variable speed drive 3 by motor M.

Wire drive mechanism (FIGS. 1 and 1a)

The wire drive wheel 4 has its tachometer $T_1$ and drive shaft 10 connected to the low output side of speed reducer $SR_1$ whose input is connected to the output shaft 11 of the variable speed drive 3 whose input shaft 12 is driven by the constant speed motor M. The diameter of wire drive wheel 4 is selected to provide a maximum linear wire speed $V_w$ of 100 in./sec. with an input speed of 120 r.p.m. (2 r.p.s.) applied to its drive shaft 10 (15.94 in. pitch diameter of wheel) calculated as follows:

$$V_w \text{ in./sec.} = \pi \text{ Din. } N_{r.p.s.} \text{ or } D = \frac{V_w}{\pi N}$$

whence if $V_w = 100$ in./sec. and $N = 2R$/sec. $D = 100/2\pi = 15.94''$ pitch diameter. The wheel width is sufficient to provide for at least one wrap-around of wire W drawn from the tensioning devise 2 and is flanged at 4a at its opposite rims to prevent ride-off of the wire. The wheel surface is preferably serrated or provided with a friction surface to prevent wire slippage, being similar in this respect to a cable winch drive. As an alternative, as shown in FIG. 1a, for solid wire or stranded wire $W^1$ too stiff to wrap around wheel 4', a pressure wheel 4b is provided to bear on the wire W as it passes across the top of the wire drive wheel 4', thus providing a slip-proof friction drive for the wire. These arrangements are conventional in existing wire cut-off mechanisms.

Measuring mechanism (FIGS. 2, 2a, 2b, 2c)

Figure 2:
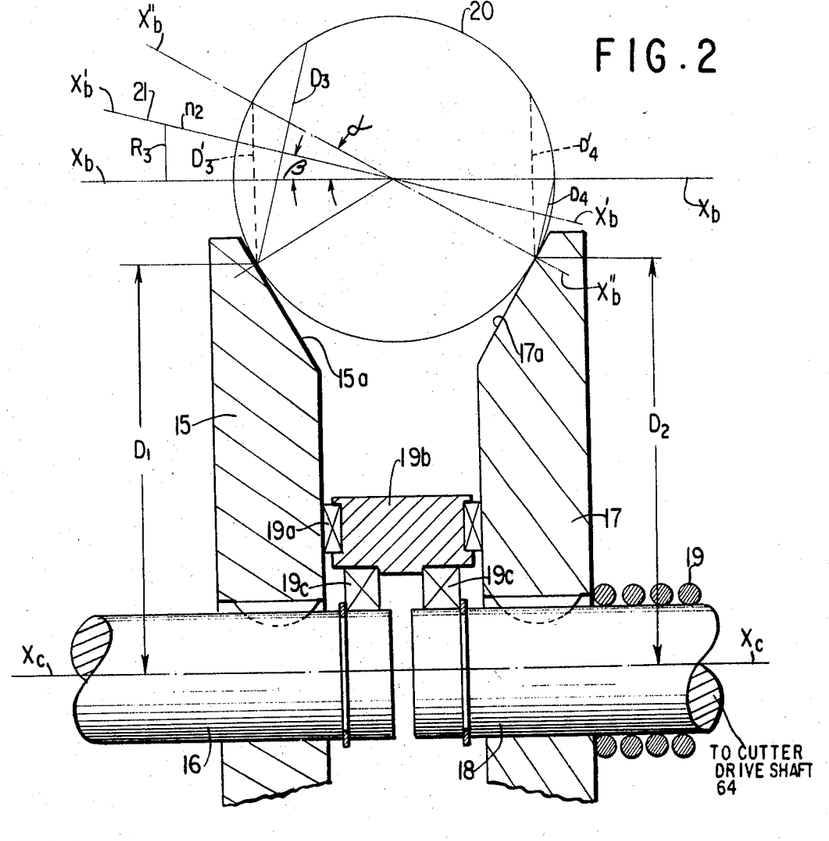
FIG. 2 is a diagrammatic illustration of the measuring system utilized in the machine of this invention.
Figure 2A:
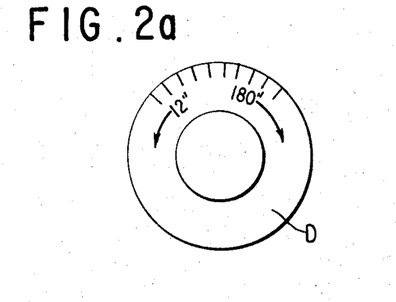
FIG. 2a is a fragmentary elevational view of a dial-setting mechanism for selecting desired wire lengths for cut-off.
Figure 2B:
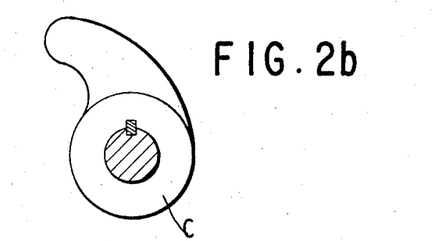
FIG. 2b is a plan view of a linearizing cam associated with said dial-setting mechanism.

The measuring arrangement or system 5 of this invention which is intended to be driven from the constant speed drive is illustrated in principal in FIGS 2, 2a and 2b. Its operation is based upon a cone-ball principle that has been successfully utilized in commercially available cone-power drives. Most such cone-power drives, however, utilize three steel balls mounted on and free to rotate on shafts passing through their centers. These balls are located between a pair of truncated cones mounted on coaxial independent shafts. These cones are spring-biased toward each other so that a frictional force is exerted on the three steel balls. The axes of the shafts of said three balls are simultaneously adjustable with respect to the common axis of the two independent cone shafts so as to provide variable speed of the output cone shaft relative to the speed of the input cone shaft. Such triple ball arrangements are fairly complex and, moreover, do not provide for a zero output speed.

These disadvantages are overcome in a greatly simplified construction embodied in this invention wherein a single control-ball only is utilized between the truncated cones. The single ball is provided with a single shaft which protrudes from one side only of the single ball.

As seen schematically in FIG. 2, applicant's measuring system 5 comprises a truncated driving cone 15 mounted on an input drive shaft 16 driven by constant speed drive $M_2$. A second truncated driven cone 17 of like dimensions is slidably mounted on a coaxial, independent output shaft 18 being biased toward cone 15 as by a spring 19. Axial thrust bearings 19a of the needle type supported in a bearing housing 19b provide end support for the cones 15 and 17 and radial thrust ball bearings 19c carried by such bearing housing provide radial thrust support for the ends of shafts 16 and 17.

A single steel ball 20 is supported rotatably on a shaft 21 (FIG. 2c) and equipped with suitable ball bearings 21a so that the surface of ball 20 is spring-biased toward and is frictionally engageable with the facing sloping surfaces 15a and 17a of the two truncated cones 15 and 17. The projecting end 21b of this shaft 21 is supported in a guided slide block 22 so that the axis of shaft 21 may be angularly displaceable through a variable angle $\beta$ (FIG. 2) about the center of ball 20 from a horizontal position parallel with line $X_b$—$X_b$ and the axes $X_c$—$X_c$ of the cone shaft 16 and 18 when $\beta = 0$, to a position at which the axis $X_b''$—$X_b''$ is perpendicular to the surface 17 at which time $\beta = \alpha$ as a limiting value.

By reference to FIG. 2, it will be noted that when the axis of ball shaft 21 is disposed horizontally along $X_b$—$X_b$ parallel with cone axes $X_c$—$X_c$ and $\beta = 0$, the ball diameters $D'_3$ and $D'_4$ both perpendicular to axis $X_b$—$X_b$ and respectively in tangent contact with the surfaces of input cone 15 and output cone 17 are exactly equal. Therefore, the rotary speed of the driven output cone 17 then equals the rotary speed of the driving input cone 15. This can be shown to provide the maximum output speed for the system since the ratios of $D_2/D_1$ will then be equal to 1 to 1. On the other hand, if the angle of axis $X_b$—$X_b$ of the shaft 21 of control ball 20 is changed by an angle $\beta$ to a position $X^1_b$—$X^1_b$ (as by elevating the left end of shaft 21 through a distance $R_3$), then the ball diameter $D_3$ perpendicular to axis $X^1_b$—$X^1_b$ is in contact with the input cone 15 while the ball diameter $D_4$ is in contact with the output cone 17. Therefore, the speed of the output cone then will differ from that of the input cone and will be less by the ratio $D_4/D_3$. For zero output speed, the diameter $D_4$ should be zero and this will occur when the angle $\beta$ of shaft 21, i.e., its axis $X''_b$—$X''_b$ is equal to a limit $\alpha$ at which time $X''_b$—$X''_b$ is perpendicular to the surface of the output cone 17.

For wire lengths $L_w$ from 12 inches to 180 inches, the distance $R_3$ which the protruding end of the control ball shaft 21 must be elevated above the horizontal axis $X_b$—$X_b$ is given by the following formula:

(I) $$R_3 = R_2 \sqrt{\frac{1}{\frac{(N_1 L_w + V_w)^2 \cos^2 \alpha}{(N_1 L_w + V_w)^2 \sin^2 \alpha} + 1}}$$

where:

$N_1$ = Input cone speed in r.p.s.
$L_w$ = desired wire length in inches
$V_w$ = Wire velocity in inches per second
$\alpha = 90°$ — cone angle (e.g. 60°) = 30°
$R_2$ = a constant selected by design considerations and may, for example, be 4 inches.
$R_3$ = vertical component or distance from the outer end of $R_2$ to the horizontal axis $X_b$—$X_b$.

This formula is derived as follows where:

$D_3$ = diameter of ball in tangent contact with conical surface of input cone 15 at angle $(\alpha + \beta)$
$D_4$ = diameter of ball in tangent contact with conical surface of output cone 17 at angle $(\alpha - \beta)$
$N_1$ = input speed of cone 15 in r.p.s.
$N_2$ = output speed of cone 17 in r.p.s.
$D_1 = D_2$ = diameters of input and output cones 15 and 17 at their tangent contact with ball
$t$ = time in seconds
$\beta$ = angle between $X_b$—$X_b$ and $X'_b$—$X'_b$.

Then:

(1) $$D_3 = 2R_1 \sin (\alpha + \beta)$$

(2) $$D_4 = 2R_1 \sin (\alpha - \beta)$$

(3) $$N_2 = \frac{D_1}{D_3} \times \frac{D_4}{D_2} \times N_1$$

since $D_1 = D_2$ (4) $$N_2 = \frac{D_4}{D_3} \times N_1$$

Wire vel. $V_w = 100''$/sec.
$L_w$ = length of wire—in inches.

(5)
$$L_w = V_w t \text{ or } t = \frac{L_w}{V_w}$$

Since $D_2$ makes one revolution for a given $L_w$, (6)
$$N_2 = \frac{1}{t} = \frac{V_w}{L_w}$$

(7) $\qquad R_3 = R_2 \sin \beta$

Substituting in 4

(8)
$$\frac{V_w}{L_w} = \frac{2R_1 \sin(\alpha - \beta)}{2R_1 \sin(\alpha + \beta)} \times N_1$$

Expanding and cancelling common terms in numerator and denominator (9)
$$\frac{V_w}{L_w} = N_1 \frac{(\sin \alpha \cos \beta - \cos \alpha \sin \beta)}{(\sin \alpha \cos \beta + \cos \alpha \sin \beta)}$$

Cancelling common terms in numerator and denominator (10)
$$\frac{V_w}{L_w} = \frac{N_1 \sin \beta \left( \sin \alpha \frac{\cos \beta}{\sin \beta} - \cos \alpha \right)}{\sin \beta \left( \sin \alpha \frac{\cos \beta}{\sin \beta} + \cos \alpha \right)}$$

(11)
$$V_w \left( \sin \alpha \frac{\cos \beta}{\sin \beta} + \cos \alpha \right) = N_1 L_w \left( \sin \alpha \frac{\cos \beta}{\sin \beta} - \cos \alpha \right)$$

(12)
$$V_w \sin \alpha \frac{\cos \beta}{\sin \beta} + V_w \cos \alpha = N_1 L_w \sin \alpha \frac{\cos \beta}{\sin \beta} - N_1 L_w \cos \alpha$$

(13) $(N_1 L_w + V_w) \cos \alpha = (N_1 L_w - V_w) \sin \alpha \frac{\cos \beta}{\sin \beta}$ (14)
$$\frac{(N_1 L_w + V_w) \cos \alpha}{(N_1 L_w - V_w) \sin \alpha} = \frac{\sqrt{1 - \sin^2 \beta}}{\sin \beta}$$

squaring both sides (15)
$$\frac{(N_1 L_w + V_w)^2 \cos^2 \alpha}{(N_1 L_w - V_w)^2 \sin^2 \alpha} = \frac{1 - \sin^2 \beta}{\sin^2 \beta}$$

(16)
$$\frac{(N_1 L_w + V_w)^2 \cos^2 \alpha}{(N_1 L_w - V_w)^2 \sin^2 \alpha} + 1 = \frac{1}{\sin^2 \beta}$$

since $\sin^2 \beta = \frac{(R_3)^2}{(R_2)^2}$ and $\frac{1}{\sin^2 \beta} = \frac{(R_2)^2}{(R_3)^2}$ (17)
$$\frac{(N_1 L_w + V_w)^2 \cos^2 \alpha}{(N_1 L_w - V_w)^2 \sin^2 \alpha} + 1 = \frac{(R_2)^2}{(R_3)^2}$$

Invert and take square root (18)
$$R_3 = \sqrt{\frac{(N_1 L_w - V_w)^2 \sin^2 \alpha (R_2)^2}{(N_1 L_w + V_w)^2 \cos^2 \alpha + (N_1 L_w - V_w)^2 \sin^2 \alpha}}$$

Extract numerator under square root and factoring denominator and extracting square root of denominator.

(19)
$$R_3 = \frac{(N_1 L_w - V_w) R_2 \sin \alpha}{(N_1 L_w - V_w) \sin \alpha} \sqrt{\frac{1}{\frac{(N_1 L_w + V_w)^2 \cos^2 \alpha}{(N_1 L_w - V_w)^2 \sin^2 \alpha} + 1}}$$

Cancelling common terms in numerator and denominator.

(20)
$$R_3 = R_2 \sqrt{\frac{1}{\frac{(N_1 L_w + V_w)^2 \cos^2 \alpha}{(N_1 L_w - V_w)^2 \sin^2 \alpha} + 1}}$$

The relationship between $R_3$ and $L_w$ is non-linear. This is shown in FIG. 2d, wherein ordinates are $R_3/R_2 = \sin \beta$ and the abscissae are $L_w$ in inches. Since it is desirable that the machine operator be provided with a linear output dial D calibrated in inches and fractions for $L_w$ to adjust the angle $\beta$ of the shaft 21 of the control ball relative to $X_b$—$X_b$ from 0 to a maximum $\beta = \alpha$, a non-linear converter in the form of a cam C must be provided for interconnecting the dial D and axis of shaft 21 to secure the desired value of $R_3$. Thus, as seen in FIGURE 2c, a cam follower ball roller 21c is provided at the outer end of shaft 21b which rides on the surface of cam C. The guided slide block 22 is spring-biased to urge roller 21c against said cam. An adjustable spring-loaded ball 22a mounted in the fixed frame part 22b preloads the control ball 20 into engagement with cone surfaces 15a and 17a. The dial D is calibrated in inches from 12" to 180". The guiding of block 22 serves merely to prevent rotation of the control ball shaft 21 at right angles to the plane of the drawing (FIGURE 2c).

In a practical embodiment of the invention, the selected cone angle for each of cones 15 and 17 is 60°. Thus, since $\alpha = 90°$ —cone angle, it equals $90° - 60° = 30°$. The selected value of $R_2$ is 4 inches. Thus, when $L_w = 180$ inches and the wire velocity $V_w$ is 100 in./sec. and $\beta = 29°$, then $N_1$ as calculated from Formula 8 or 9 above is 27.26 r.p.s. Substituting these values in Formula I, (col. 4), the latter now becomes (II)
$$R_3 = 4 \sqrt{\frac{1}{\frac{(27.26 L_w + 100)^2 \times 3}{(27.26 L_w - 100)^2} + 1}}$$

Thus, the shape of cam C necessary to shift the axis of shaft 21 the desired amount $R_3$ for wire lengths $L_w$ between 12 inches and 180 inches can be derived. Its approximate shape is shown in FIGURE 2b. For wire lengths $L_w$ below 12 inches the input speed N remains constant at 27.26 r.p.s., the angle $\beta = 17° - 04'$ (the required setting for a 12" wire length), remains constant and the speed of the wire wheel is adjusted by means of the variable speed drive and tachometer read-out to provide wire lengths required as will be described.

TABLE I

| $L_w$ in inches | $V_w$ in inches/sec. | Production, Parts/hr. | Time per Part (sec.) |
| --- | --- | --- | --- |
| 2 | 16.67 | 30,000 | .120 |
| 6 | 50 | 30,000 | .120 |
| 12 | 100 | 30,000 | .120 |
| 18 | 100 | 20,000 | .180 |
| 24 | 100 | 15,000 | .240 |
| 30 | 100 | 12,000 | .300 |
| 36 | 100 | 10,000 | .360 |
| 42 | 100 | 8,571 | .420 |
| 180 | 100 | 2,000 | 1.800 |

With a wire wheel diameter of 15.95", wire wheel speed $N = 1.2 V_w =$ r.p.m. approximately.

The production rate for any wire lengths from 12 inches to 180 inches with a wire velocity of $V_w = 100$ in./sec. is given by the following formula:

(III)
$$P = \frac{360,000}{L_w}$$

where $P$ = parts/hr., $L_w$ = wire length in inches.

From Table I above, it is to be noted that for $L_w = 12$ inches down to 2 inches, the time per piece is constant at .120 second. Thus, for cutting wire in this range of lengths, the wire velocity $V_w$ must be changed in accord with Formula 5 above, namely $L_w = V_w t$. This means that the ratio $L_w/V_w$ is a constant, in this instance, being .120. Further, operational procedure requires that the control ball axis angle $\beta$ be set for the speed $N_1$ for $L_w = 12$ inches and remain undisturbed. This is accomplished by setting dial D of the measuring device to the value $L_w = 12"$. Hence, the wire velocity $V_w$ is the only variable available and is adjusted downwardly by control of the variable speed drive 3 (FIG. 1) to provide readings at tachometer $T_2$ (which as noted is calibrated in inches from 12 down to 2"), to the required $L_w$ reading in inches. As a result, the proper lower wire velocity $V_w$ will result because of corresponding lower speed to the wire drive wheel 4. For example, if at $L_w=12$ inches, $V_w$ as shown in Table I is 100 inches/sec., when the desired $L_w$ is 6″, $V_w$ is 50, while for $L_w=2″$, $V_w$ is 16.67.

Because of the fixed setting for $L_w=12$ inches on dial D of the measuring device at such time, the sum and difference of the angles $\alpha$ and $\beta$ remains constant. Likewise, $N_1$, the input speed of cone 15 of the measuring system 5 must also remain constant, having the value 27.26.

With this in mind, its truth can be demonstrated by the following calculations:

Referring to Formula 9 and solving for $N_1$ (9a) $$N_1 = \frac{V_w(\sin \alpha \cos \beta + \cos \alpha \sin \beta)}{L_w(\sin \alpha \cos \beta - \cos \alpha \sin \beta)}$$
$$= K_1 \times K_2 = K_3$$

to calculate $\sin \beta$ when $L_w = 12_w'$, $V_w = 100″/\text{sec.}$ since $$\frac{R_3}{R_2} = \sin \beta, R_2 = 4 \text{ and } N_1 = 27.264$$

then from Formula II.

$$\frac{R_3}{4} = \sqrt{\frac{1}{\frac{(27.26 \times 12 + 100)^2}{(27.26 \times 12 - 100)^2} + 1}}$$

$$= \sqrt{\frac{1}{\frac{547294.4832}{51583.4944} + 1}} = \sqrt{\frac{1}{10.609 + 1}}$$

$$= \sqrt{\frac{1}{11.609}} = \sqrt{.08614} = .29349 = \sin \beta$$

$\cos^2 \beta = 1 - \sin^2 \beta = 1 - (.29349)^2 = 1 - .0861363 := .91386362$ $\cos \beta = .9559$; as $\alpha = 30°$, $\sin \alpha = .500$ $\cos \alpha = .86603$ then $\sin \alpha \cos \beta = .500 \times .9559 = .47795$ $\cos \alpha \sin \beta = .86603 \times .29349 = .25417$
$$+.73212$$
$$-.22378$$

Then using Formula 9a $$N_1 = \frac{V_w \times .73212}{L_w \times .22378} = 3.2718 \frac{V_w}{L_w} = K_3 = 27.264$$

Then, when $L_w = 6″$, $V_w$ must $= 50$. When $L_w = 2″$, $V_w$ must $= 16.67$.

$$N_1 = 3.2718 \times \frac{50}{6} = 27.264 \quad N_1 = 3.2718 \times \frac{16.67}{2} = 27.264$$

Referring again to FIG. 1, it will be noted that the input of the measuring system 5 is connected to a constant speed drive $M_2$ with tachometer $T_2$ readout in r.p.s. In turn, the output of the measuring system 5 is mechanically connected to the cutter drive 6 as will be described. The input of the latter is also connected to the output of the variable speed drive 3 through a speed reducer $SR_2$. The output of said measuring system 5 is so arranged that it will deliver a mechanical triggering signal to the cutter drive once for each revolution of the output cone 17 of the measuring system 5. This signal is generated by a cam (to be described) which will trigger the release of a mechanical clutch (to be described) in the cutter drive.

Cutter drive and cutters (FIGS. 3–9 inclusive)

The cutter drive 5 and cutters operated thereby embody unique principles. In current known art, all wire cutters are actuated linearly. In contrast, in the machine of this invention, the wire cutters are rotatably actuated. This has certain advantages. If the linear speed of the cutter edges is equal to the linear speed of the wire being cut, the latter may be driven continuously and the cutters triggered to operate at intervals consistent with the length of wire desired. This means that for a given wire length, wire transport time will not introduce any delay in overall cycle time, since the wire need not be stopped for cutting. The only proviso is that the cutter cycle time must be less than the wire transport time for the maximum production rate. Present considerations indicate that this must be less than 120 milli-seconds. In this machine, the cutter drive is designed for an overall cycle time of about 80 milliseconds.

Figure 3:
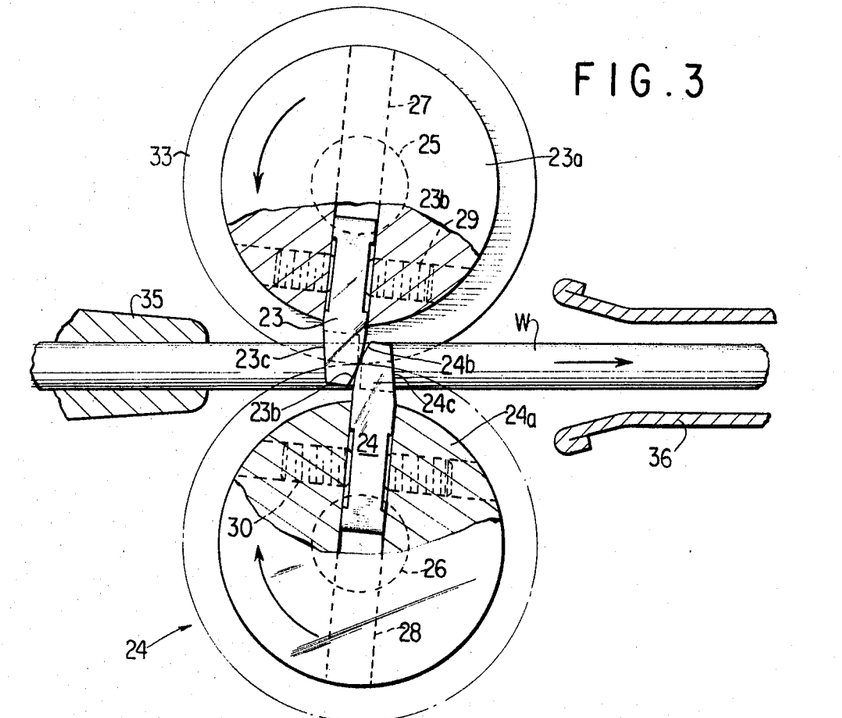
FIG. 3 is a diagrammatic elevational view of the cutter mechanism of the machine of this invention illustrating the cutters mounted in their supporting heads.
Figure 3A:
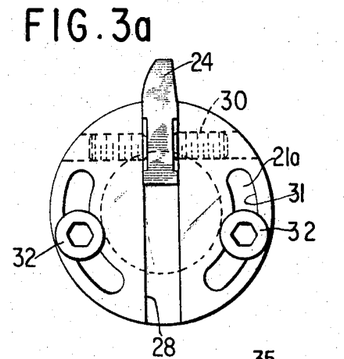
FIG. 3a is an end view of a cutter head.
Figure 3B:
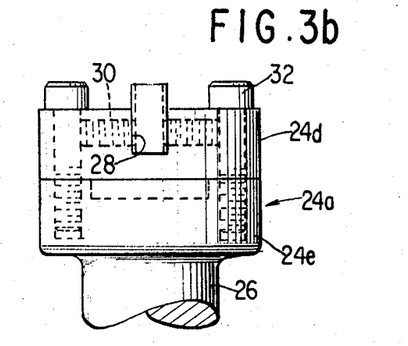
Figure 3C:
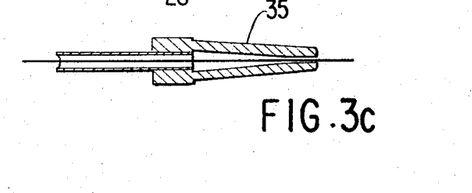
FIG. 3c is a fragmentary sectional view of a wire guide.

Details of the cutters and the cutter drive in the machine of this invention are illustrated in FIGS. 3, 3a and 3b.

Referring first to FIGURES 3, 3a and 3b, in FIG. 3, which is an enlarged elevational view of the cutters 23 and 24 as mounted in their respective supporting heads 23a and 24a, the forward face 23b of upper cutter 23 and the trailing face 24b of lower cutter 24 are of involute form (based, for example on 8 D.P., 14½° gear teeth). The opposite faces 23c and 24c of said cutters 23 and 24 are hollowed out to form respective V-shaped cutting edges (see FIGS. 10, 11 and 12). The bottom of each V falls outside the pitch line of its cutter by approximately .005 inch, so that when the forward faces of the cutters mesh, the respective V sections overlap, thus crossing the axial center line of the wire W to be cut that is passing between the supporting heads 23a and 24a, thus providing a positive severance of the wire. The cutters 23 and 24 are so designed as to sever wires uep to ⅜ inch in diameter without adjustment.

The cutter-supporting heads 23a and 24a comprise adapters 23d and 24d secured respectively to bases 23e and 24e that are fixedly mounted on the respective cutter drive shafts 25 and 26. The cuttters 23 and 24 are fitted into respective diametrically disposed grooves 27, 28 arranged in the outer plane faces of adapters 23d and 24d. Each cutter 23 and 24 is secured in place in its respective groove by respective pairs of set screws 29, 30 threaded into appropriate holes in said adapters 23b, 24b so that the cutters 23 and 24 may be initially positioned as described for wire cutting and later be reset in their respective adapter heads after sharpening. In addition, the lower cutter adapted 24d is provided with radial slots 31 and locking screws 32 extending through said slots and threaded into part 24e so that lower cutter 24 may be phased with respect to upper cutter 23 without any change of position of part 24e on its drive shaft 26. The upper head 23a is provided with annular peripheral flanges 33, 34 (FIG. 4) which guide the wire W being fed for cutting between the cutter heads 23a and 24a.

In practice, the wire W to be cut is fed from the wire drive wheel 4 (FIG. 1) through a removable entrance wire guide 35 and between cutter heads 23a and 24a, for severance by cutters 23 and 24 and the severed wire passes outwardly through exit wire guide 36 to the wire collector and bundler 7. The guide 35 must be changed for differently diametered wires and is removable from the machine for replacement as needed.

Figure 4:
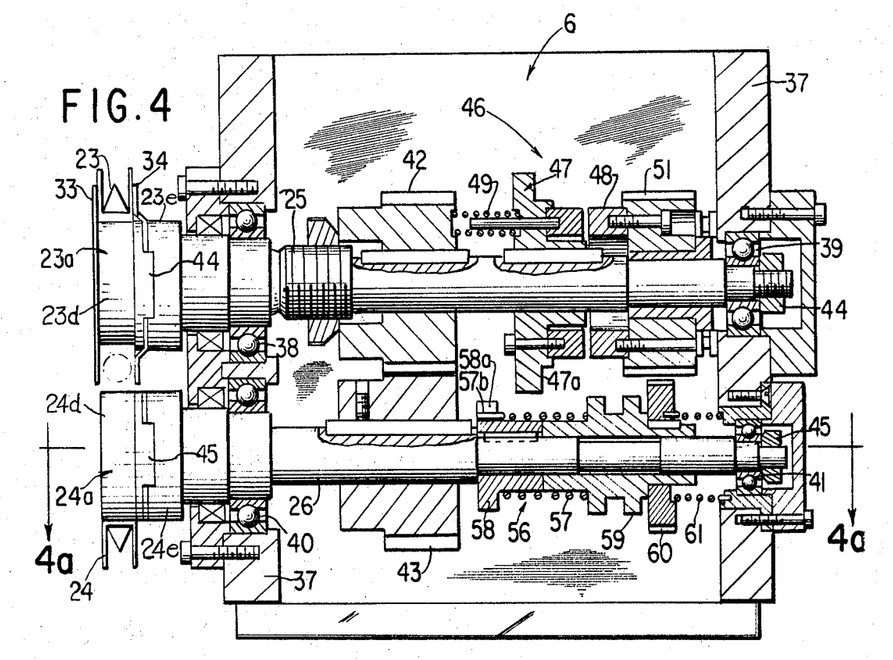
FIG. 4 is a side elevation of the cutter operating mechanism of the machine of this invention.

As seen in FIG. 4, the cutter drive mechanism 6 is mounted on an appropriate frame 37.

The upper and lower cutter head drive shafts 25 and 26 are supported for parallel rotation in the frame 37 by journalling in respective pairs of anti-friction bearings 38, 39 and 40, 41. Intermeshing change gears 42, 43 keyed on respective shafts 25 and 26 provide for opposite rotation of said shafts. Cutter heads 23 and 24 are respectively bolted to the outer ends of upper and lower drive shafts 25 and 26 in co-planar relationship, being respectively centered by pilots 44, 45 on said ends of said shafts.

A mechanically actuated jaw type clutch 46 is mounted on cutter drive shaft 25. This clutch 46 includes a driven member 47 slidably keyed on shaft 25 which is urged toward clutch driving member 48 as by compression springs 49, but is prevented from engaging or closing with driving member 48 unless a cam roller 50 (FIG. 8) is withdrawn from surface engagement with a surface 47a of driven member 47. The surface 47a of driven member 47 functions as a throw-out cam. It covers approximately 180° of the circumference of the outside diameter of driven member 47. Its leading edge 47b in direction of rotation of member 47 is tapered at 30° to provide smooth engagement with roller 50. Its trailing edge 47c is straight. Thus, while cam 47a is engaged by roller 50, the roller 50 prevents the clutch driving member 48 from engaging and driving member 47 for purposes presently to be described. The clutch driving member 48 is provided with a driven gear 51 (FIG. 4 and FIG. 8) meshing with an input drive gear 52 fixed on an input drive shaft 53, which latter is journalled in anti-friction bearings 54 and 55 on the machine frame 37. The said input drive shaft 53 is connected to output shaft 11 of the variable speed drive 3 (FIG. 1) via the speed reducer $SR_2$.

Figure 4A:
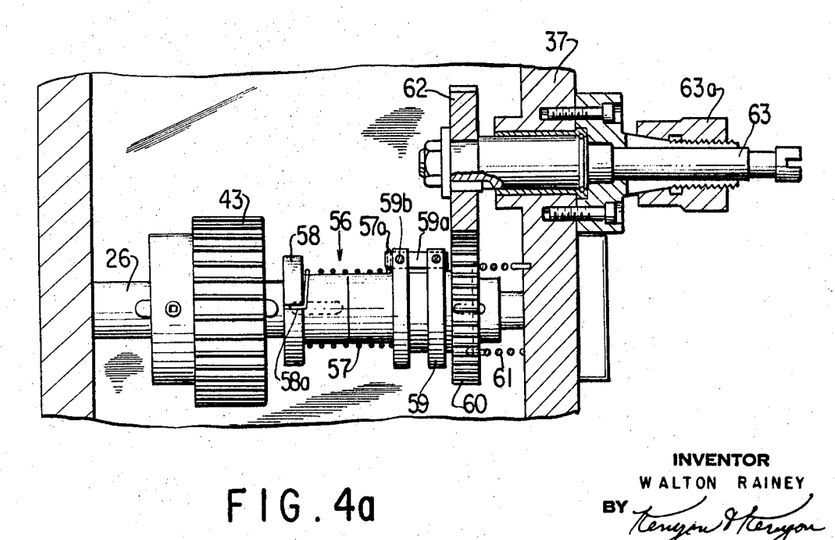
FIG. 4a is a fragmentary elevational view along line 4a—4a of FIG. 4 of details of the cutter drive mechanism.
Figures 5, 5A, 10, 11, 12:
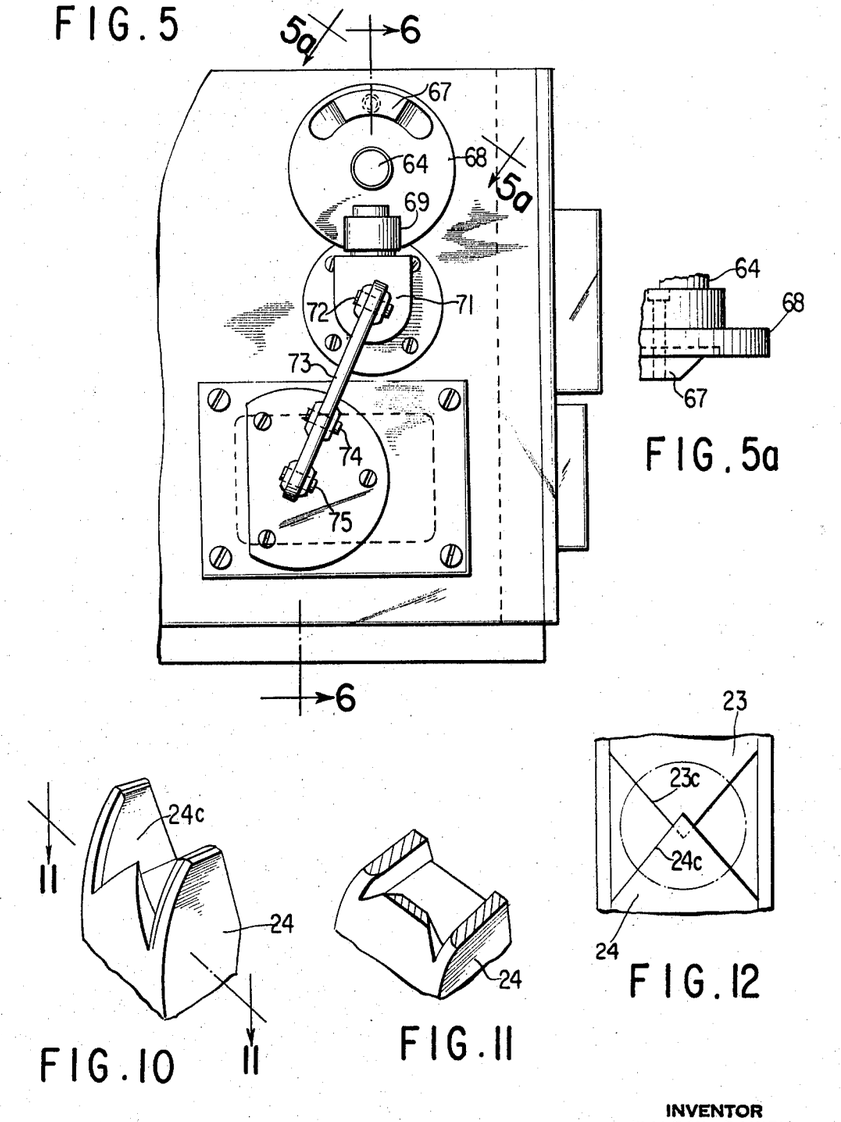
FIG. 5 is a partial elevational view of the braking and clutch operating mechanisms of the drive for the cutters.
FIG. 5a is a fragmentary view taken along the plane of line 5a—5a of FIG. 5.
FIG. 10 shows the configuration of a cutter.
FIG. 11 is a section taken along the plane of line 11—11 of FIG. 10.
FIG. 12 shows the cooperation between the two cutters.

A torsion brake 56 (FIGS. 4, 4a, 7 and 7a) comprising coiled torsion spring 57, reaction member 58, shifter 59, tang 59a with adjusting set screws 59b therefor, phasing gear 60 and return coiled spring 61 are mounted on the lower cutter driving shaft 26. The tang 59a is adjustably secured for relative axial displacement in shifter 59 as by set screws 59b. The purpose of tang 59a is to be engageable with one end 57a of spring 57 and when so engaged to cause said spring to be wound and tightly wrapped around a portion of reaction member 58 at appropriate times, thus creating a braking torque on the system. The other end 57b of spring 57 is fixedly secured in a slot 58a of reaction member 58 (FIG. 4). Thus, while clutch 46 is released, the torsion brake 56 provides a braking action on the system and prevents rotation of cutters 23 and 24. The mating phasing gear 62 (FIG. 4a) which meshes with phasing gear 60 is mounted on a counter shaft 63 that is rotatably supported by frame 37, passing therethrough to lock nut and collar 63a. The purpose of the phasing gears 60 and 62 is to permit angular adjustment of torsion spring 57 and return spring 61 so that desired stopping position of the cutters 23 and 24 may be effected.

Figures 6, 7, 7A:
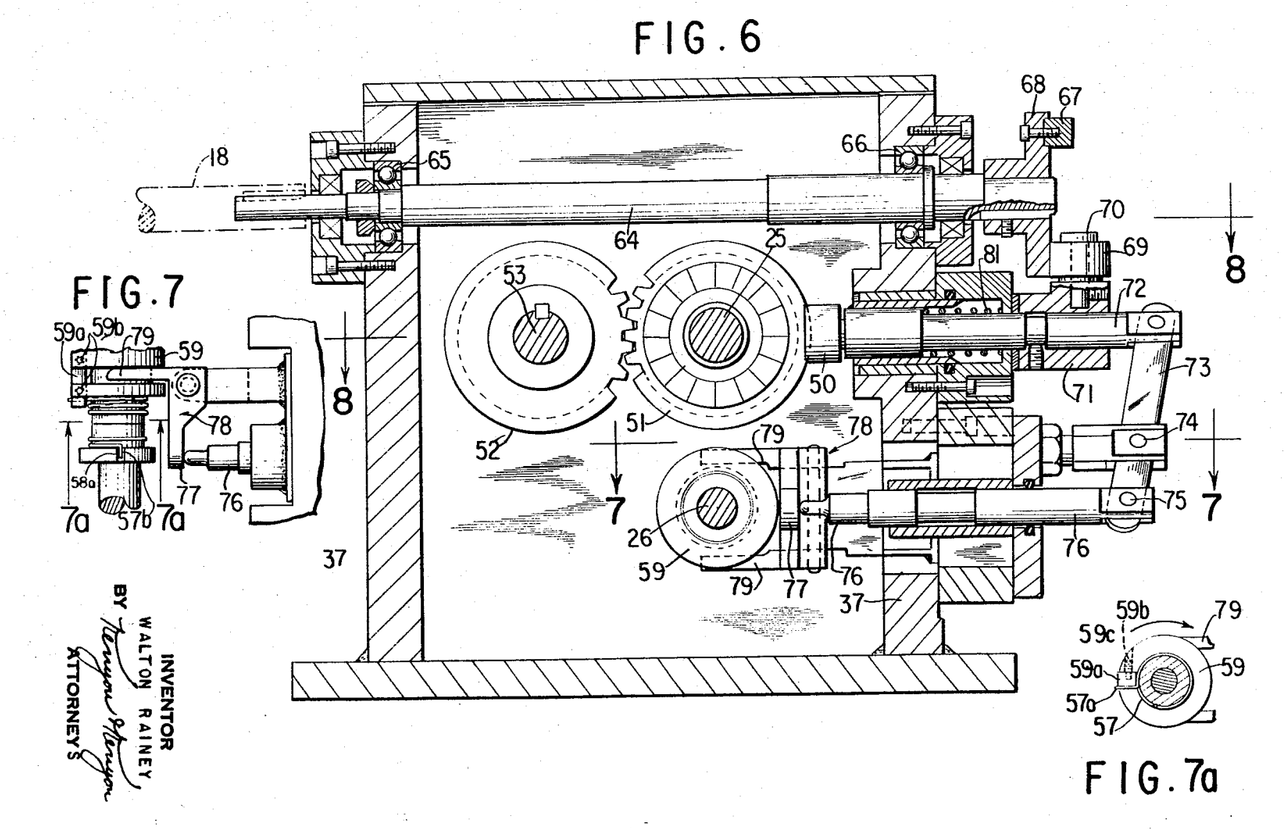
FIG. 6 is a section taken along the plane of line 6—6 of FIG. 5.
FIG. 7 is a fragmentary section taken along the plane of line 7—7 of FIG. 6.
FIG. 7a is a section taken along line 7a—7a of FIG. 7.

Referring to FIGS. 1, 2 and 6, a separate input shaft 64 is coupled to the output shaft 18 (FIG. 2) of output cone 17 of the measuring system 5 (FIG. 1). This separate input shaft 64 is journalled in anti-friction bearings 65, 66 in the machine frame 37 and carries a control cam 67 mounted in the surface of a cam carrier 68. The control cam 67 is adapted, once during each revolution of shaft 64 to engage a cam follower roller 69. The said roller 69 is secured for rotation on a spindle 70 (FIGS. 5, 6) of a support member 71 fixed to a longitudinally slidable plunger 72 which at one end carries the clutch control cam roller 50. The engagement of cam 67 with cam follower roller 69 in each revolution of input shaft 64 causes a longitudinal retracting shift of plunger 72 to move clutch roller 50 to a release position and permit clutch 46 to close by shifting driven clutch member 47 into engagement with driving clutch member 48 under action of compression springs 49. Simultaneously, a linkage 73 pivoting on a fixed pin 74 and coupled at 75 to a second slidable plunger 76, slidably mounted in the machine frame 37, shifts the latter plunger leftward in FIG. 6. The left end of said plunger 76 which engages an arm 77 of a bell crank lever 78 (FIG. 7) rotates the latter so that its other forked arms 79 which engage brake shifter cam 59 slide it and tang 59a on shaft 26 to release brake 56, thus permitting cutter shafts 25 and 26 to be driven.

Figures 8, 9, 9A:
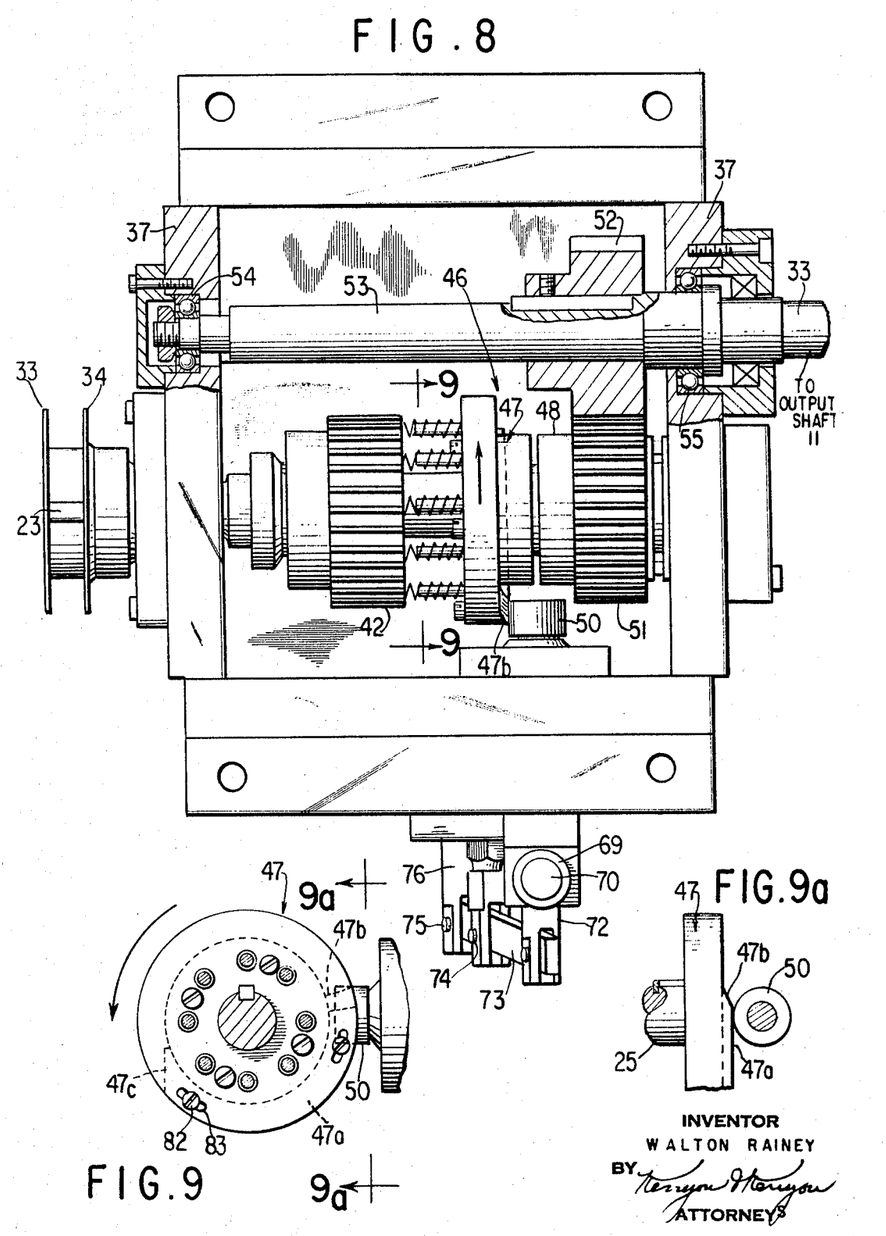
FIG. 8 is a section taken along the plane of line 8—8 of FIG. 6.
FIG. 9 is a section taken along the plane of line 9—9 of FIG 8.
FIG. 9a is a fragmentary view taken along the plane of line 9a—9a of FIG. 9.

Cam 67 is in contact with cam roller 69 only for approximately 10% of the cutter cycle, i.e., only 10% of each revolution of input shaft 64. However, when roller 69 is released (rides off cam 67) plunger 72, link 73 and plunger 76 are prevented from immediately returning to initial position by an elevated portion of the clutch throwout cam 47a which blocks cam roller 50. As noted above, cam 67, driven by the measuring system, makes one revolution for each specific wire length required, and remains in contact with roller 69 for 10% (36°) of this cycle. During this 36° period of the cycle, roller 50 is retracted and clutch members 47 and 48 are engaged. At the conclusion of this 36° period of the cycle, roller 50 is urged to return to normal unretracted position but is prevented from doing so for an additional 144° of the cycle by the clutch throwout cam 47a which lies in the path of the forward surface of roller 50. However, as the trailing edge 47c of the cam 47a passes roller 50, the latter may now return to normal position. Roller 50 is now in position to cause the driven clutch member 47 to be disengaged from the driver 48 by the camming action of the 30° sloping edge 47b on throwout cam 47a. Thus, at the appropriate point in the cutter cycle, approximately 180°, the throwout cam 47a allows cam roller 50 to be returned to initial position under biasing of spring 81 and the balance of the shifted elements then also returns to normal positions. This releases clutch 46 and resets brake 56. To insure proper phasing of clutch 46, its cam 47a is adjustable angularly as by set screws 82 in accurate slots 83 (FIG. 9). As previously noted, operation of the clutch roller 50 is simultaneously accompanied, through linkage 73 with operation of the brake shifter cam mechanism 59. Since tang 59a is secured to mechanism 59, this releases end 57a of spring 57 which is now free to rotate with lower cutter shaft 26. When roller 50 of the clutch mechanism is returned to normal position after 180° of the cycle, it follows that shifter 59 and tang 59a are also returned to normal position. Tang 59a is, therefore, then again in position to engage free end 57a of spring 57 and cause spring 57 to wind around reaction member 58 and exert its braking action and stop the drive as required at such time.

Operation

From the foregoing, it will be seen that for any desired wire-cut-off length within the operating range of the machine, i.e. from 2" to 180", and after mounting of appropriate wire guides 35 and 36 for wire of a specific diameter to be cut into the selected wire length, the wire W from the dispenser 11 is threaded through tensioning device 2, around wire drive wheel 4 and through wire guide 35, between cutter heads 23a and 24a and then through wire guide 36 toward wire collector and/or bundler 7. Then, the dial D is set by the operator to desired wire cut-off length. This, through its associated cam C, provides the necessary $R_3$ value of Formula II hereinabove and insures proper angular position β of ball shaft 21 of the ball 20 of the wire measuring system 5. Then, the operator starts drive motor M and adjusts the speed of the variable speed drive 3 to provide the needed output speed thereof so that wire wheel drive 4 will provide a wire speed or velocity $V_W$ as prescribed by Table I herein.

In consequence, after such setting has been effected, the output speed of the driven cone 17 of wire measuring device, whose shaft 18 is coupled to input shaft 64 of the cutter drive 6 will effect cut-off rotation of the cutters 23 and 24 once for each revolution of the cone 17 and sever the exactly required wire length, said severed piece moving outward from wire guide 36 into the associated wire collector and/or bundler 7. No stoppage of wire feed during cutting is required because the involute shape of the cutters as described moves the cutting edges of the cutters at the same speed as the wire being cut. The machine is very accurate ranging from 0.3%±.5" for a 180" piece to 0.1%, ±.002" for a 2" piece.

For wire lengths from 12 down to 2 inches, the operator sets dial D of the measuring instrument 5 at its 12" setting and adjusts variable speed drive 3 so that the reading on tachometer $T_1$ is that of the required wire length from 12″ to 2″.

The wire collector and/or bundler 7 may be of any conventional type which receives the severed lengths of wire from wire guide 36 and collects and bundles selected numbers of such lengths, or transfers them to separate bundling mechanism. In the alternative, it simply collects the severed lengths for storage and subsequent use.

While a specific embodiment of the machine has been described, variations within the scope of the appended claims are possible and are contemplated. There is no intention of limitation to the exact disclosure herein presented.

What is claimed is:

1. A high speed wire cut-off machine for severing selected lengths from a continuously moving wire comprising:
   means for dispensing, tensioning and feeding wire to be cut into selected lengths;
   continuously adjustable measuring means for determining the selected lengths of wire to be cut, said measuring means being adapted to be continuously adjustable to measure selected lengths of wire of different lengths, said measuring means having driving and driven cones and a single ball between the cones mounted for rotation on an angularly adjustable axis to vary the relative speeds of said cones between like speeds for both cones and zero speed for the output cone; and
   cutter means operatively connected to said measuring means in response to actuation of the latter for severing said selected lengths from the moving wire.

2. A high speed wire cut-off machine according to claim 1, wherein angular adjustment of said axis is effected by adjustment of the vertical component of axis angles according to the formula $$R_3 = R_2 \sqrt{\frac{1}{\frac{(N_1 L_w + V_w)^2 \cos^2 \alpha}{(N_1 L_w - V_w)^2 \cos^2 \alpha} + 1}}$$

wherein:
$N_1$=input cone speed in r.p.s.
$L_w$=desired wire length in inches
$V_w$=wire velocity in inches/sec.
$\alpha=90°$—cone angle
$R_2$=A constant hypotenuse of the triangle defined by $R_3$ and the horizontal
$R_3$=the altitude of said triangle.

3. A high speed wire cut-off machine according to claim 2, wherein said cone angle is 60°, $R_2$ is 4 inches for a wire velocity of 100 inches/sec., and $L_W$ ranges from 12″ to 180″.

4. A high speed wire cut-off machine according to claim 1, including:
   a variable speed driving means,
   said cutter means having a pair of co-planar rotatable cutter heads, independently mounted cutter heads supporting shafts for said cutter heads,
   a third shaft,
   means for connecting said third shaft to said variable speed driving means,
   inter-meshing gear means on said cutter head supporting shafts for rotating them in opposite directions,
   clutch means on one of said cutter head supporting shafts to provide single revolution rotation thereof for each length of wire to be cut,
   means connecting said clutch means to said measuring means to open and close said clutch means for effecting said single revolution rotation,
   releasable brake means for stopping rotation of said cutter head supporting shafts after each single rotation thereof, and
   means for simultaneously operating said clutch means to closed condition and said brake means to release condition and vice versa.

5. A high speed wire cut-off machine according to claim 4, wherein speed reducing means is provided between said variable speed driving means and said third shaft.

6. A high speed wire cut-off machine according to claim 4, wherein said means for simultaneously operating said clutch means and said brake means includes a cam and a cam follower, and shifting means connected to said cam follower.

7. A high speed wire cut-off machine according to claim 6, wherein said shifting means includes a pair of shiftable plungers one engageable with a portion of said clutch means and the other with a portion of said brake means, and a pivoted lever for shifting both said plungers simultaneously in response to operation of said cam on said cam follower.

8. A high speed wire cut-off machine according to claim 6, including means to delay return operation of said clutch means to open condition.

References Cited
UNITED STATES PATENTS

| | | | |
|---|---|---|---|
| 825,942 | 7/1906 | Smurr et al. | 83—285 |
| 1,034,164 | 7/1912 | Swift | 83—296 |
| 1,262,120 | 4/1918 | Smurr | 83—345 X |
| 1,682,016 | 8/1928 | McChesney | 83—593 X |
| 2,125,939 | 8/1938 | MacFarren | 83—674 X |
| 2,144,307 | 1/1939 | Hallden | 83—298 X |
| 2,288,988 | 7/1942 | Blount et al. | 83—285 |
| 2,548,427 | 4/1951 | Fernbach | 83—296 |
| 2,857,000 | 10/1958 | Swanbum | 83—444 X |
| 2,868,292 | 1/1959 | Hitchcock | 83—345 X |
| 2,877,845 | 3/1959 | Cameron | 83—167 X |
| 3,220,293 | 11/1965 | Barber | 83—345 |

FRANK T. YOST, Primary Examiner

U.S. Cl. X.R.

83—298, 311, 312, 345